United States Patent [19]

Martin

[11] 4,265,547

[45] May 5, 1981

[54] REVERSE DEGASIFICATION SCREW EXTRUDER WITH VACUUM SEAL

[75] Inventor: Gerhard Martin, Hanover, Fed. Rep. of Germany

[73] Assignee: Hermann Berstorff Maschinenbau GmbH, Fed. Rep. of Germany

[21] Appl. No.: 1,240

[22] Filed: Jan. 5, 1979

[30] Foreign Application Priority Data

Jan. 7, 1978 [DE] Fed. Rep. of Germany ....... 2800632

[51] Int. Cl.³ ............................. B29B 1/00; B29F 3/03
[52] U.S. Cl. ............................................ 366/79; 277/3;
  366/75; 366/139; 425/107; 425/203
[58] Field of Search ..................... 425/107, 203; 277/3;
  264/102; 366/75, 79, 139

[56] References Cited

U.S. PATENT DOCUMENTS

| 1,677,119 | 7/1928 | Kinyon ..................................... 277/3 |
| 2,064,703 | 12/1936 | Van de Graaff ........................ 277/3 |
| 2,432,734 | 12/1947 | Doesken ............................... 425/107 |
| 2,835,514 | 5/1958 | McGahan ................................. 277/3 |
| 3,376,603 | 4/1968 | Colombo ............................... 425/203 |
| 4,014,555 | 3/1977 | Jacott et al. ............................. 277/3 |

*Primary Examiner*—John C. Bleutge
*Assistant Examiner*—A. H. Koeckert
*Attorney, Agent, or Firm*—Schwartz, Jeffery, Schwaab, Mack, Blumenthal & Koch

[57] ABSTRACT

A screw extruder for processing thermoplastic materials wherein a vacuum is applied to the feed opening for the material and/or to a filling section of the cylinder for the purpose of reverse degasification, said extruder having a simultaneously rotating pressure piece between a screw and a back pressure bearing and having a stationary end piece disposed on the screw side in front of the rotating pressure piece and sealing means comprising at least two axially spaced radial sealing rings and a vacuum source to apply vacuum to an annular interspace formed between the sealing rings.

2 Claims, 2 Drawing Figures

REVERSE DEGASIFICATION SCREW EXTRUDER WITH VACUUM SEAL

BACKGROUND OF THE INVENTION

The invention relates to a screw extruder for processing thermoplastic materials, wherein a vacuum is applied to a feed opening for the material and/or to a filling section of a cylinder of the extruder for the purpose of reverse degasification, the extruder having a simultaneously rotating pressure piece located between the screw of the extruder and a back pressure bearing and a stationary end piece disposed on the screw side in front of the rotating pressure piece with a seal surrounding the pressure piece.

The seals, such as sealing rings, packing etc., used in known screw extruders are not adequate for ensuring the production and maintenance of a vacuum in the filling region of the screw extruder to effect reverse degasification.

Reverse degasification is frequently carried out during the processing of LD-PE. Usually an opening is provided on a part of the extruder cylinder on the gear side, and vacuum pumps are connected to this opening by way of vacuum lines in order to remove residual monomers such as ethylene gas from the extruder and thus to obtain a product free of gas occlusions.

It is further known to use retaining rings, which however only perform their sealing function in extruders with reverse degasification and to which a vacuum source is applied, up to a maximum pressure of 0.1 bar. When retaining rings are used it is not possible to apply a higher vacuum.

SUMMARY OF THE INVENTION

The invention has among its objects to provide an inexpensive sealing means which is high vacuum tight and extremely reliable in operation.

It is also among the objects of the present invention to provide a sealing means which can be used in an extruder with reverse degasification, i.e. wherein degasification takes place by means of a vacuum created between the gear unit and the end of the screw or of the cylinder on the gear side.

The sealing means is intended to ensure firstly that the reverse degasification of the extruder provided on the gear side remains fully effective and secondly to ensure that no air, oxygen or gear oil penetrates the radial seal, since this would cause oxidation and lead to considerable material damage and contamination.

The problem is solved in respect of an extruder in that the sealing means comprises at least two axially spaced radial sealing rings and vacuum means to apply vacuum to annular interspaces between said sealing rings.

The vacuum applied between the radial sealing ring may be higher than the vacuum applied by a vacuum source to the region of the feed opening on the screw side for effecting reverse degasification, thus ensuring that the space on the screw side is completely sealed from the space on the gear side.

Alternatively, there may be a plurality of annular interspaces, with one of the annular interspaces completely or partially filled with oil or having oil passing therethrough.

The advantages of the vacuum sealing system according to the invention can be seen in particular in its extremely simple mounting process and its great reliability in operation. The sealing system can be very sturdy and need not be damaged in any way during mounting or dismounting of the screw. Simple, commercially used retaining rings make possible the vacuum sealing system, it being possible further to increase the reliability in operation if the annular interspace between the radial seal on the gear side and the radial seal arranged therebeside is filled completely or partially with oil or if oil is permitted to flow through this space. If this annular interspace is filled completely with oil or if oil flows therethrough, then it is not necessary to connect this space to the vacuum source. The vacuum source is used in this case for the oil flowthrough.

By advantageously combining radial seals disposed at a predetermined spacing from one another, with a vacuum source connected to the interspaces thus formed, it is possible to provide a sealing system which is absolutely vacuum tight and oil tight.

BRIEF DESCRIPTION OF THE APPLICATION DRAWINGS

The invention is diagrammatically illustrated by way of example in the accompanying drawings, in which:

FIG. 1 shows a partial longitudinal section in diagrammatic form through the gear-side end of a screw extruder according to the invention; and FIG. 2 shows a portion of FIG. 1 to a greater scale.

DETAILED DESCRIPTION OF THE PREFERRED EMBODIMENTS

Figure 1:
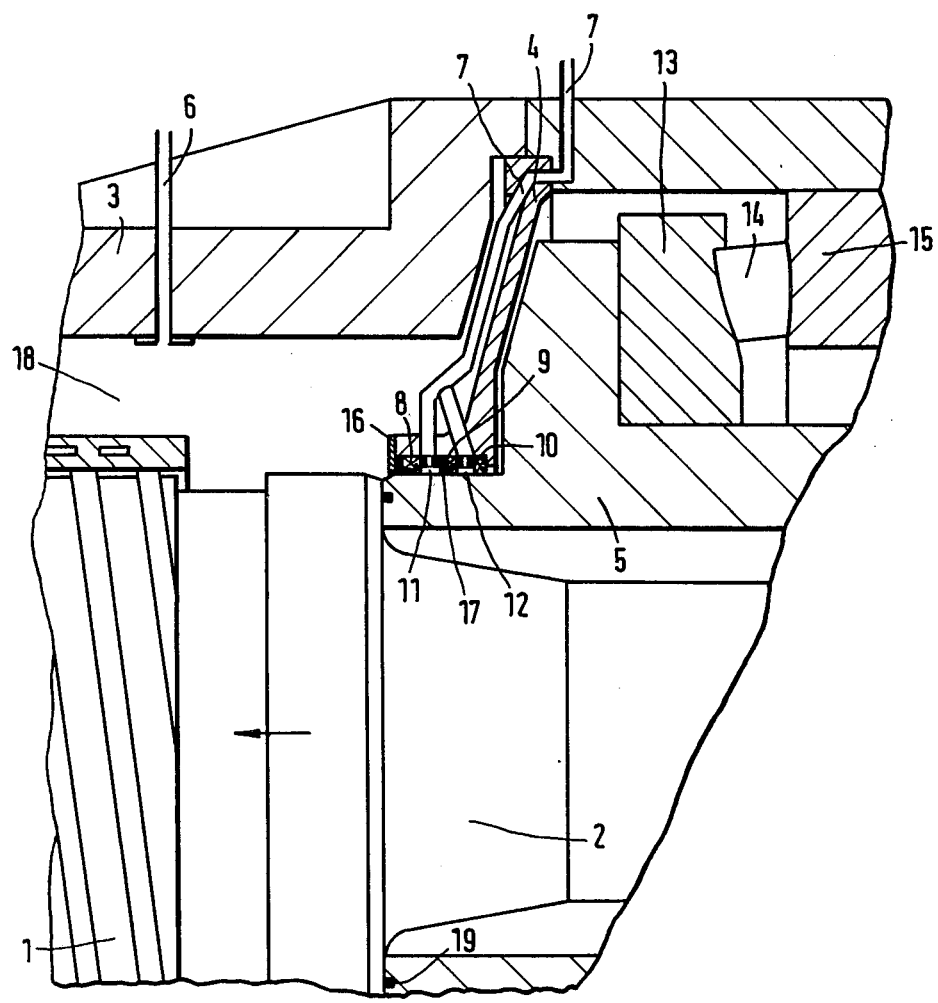
Figure 2:
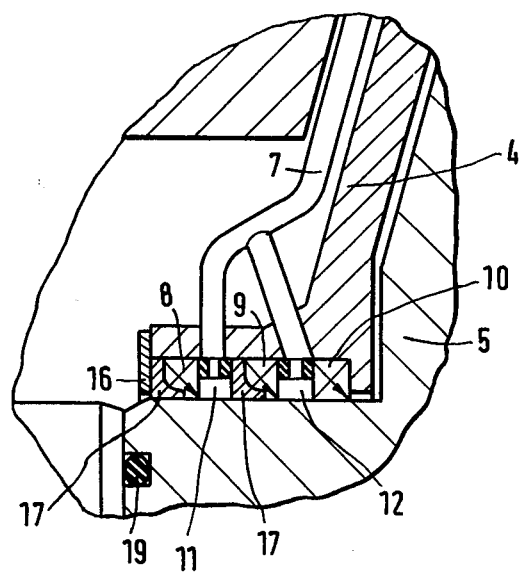

Referring to the drawings, adjacent a filling member 3 of a screw extruder for processing plastics materials there is located the rearward end of a screw having a back feed thread 1 disposed thereupon and a screw shaft spindle 2. A back pressure bearing is formed by a rotatable barrel ring 13, rollers 14 and a stationary barrel ring 15.

A non-rotatable end piece 4 forms, together with the filling member 3 and the back feed thread 1 of the screw, a space 18, to which a vacuum line 6 is connected for the reverse degasification of the material to be processed in the extruder.

A pressure piece 5, which rotates with the screw shaft spindle 2 is mounted on a transmission shaft (not illustrated). Radial sealing rings 8, 9 and 10 are mounted in the end piece 4 and surround the rotating pressure piece 5. The radial sealing ring 8 is protected on the screw side against external contamination and damage by means of a wiper plate 16.

A vacuum source (not illustrated) can be connected by way of a vacuum line 7 to annular interspaces 11 and 12 between the sealing rings 8, 9 and 10, with such interspaces being formed by annular rings having opening(s) formed therein by means of which the vacuum line 7 and branch thereof can communicate with the spaces 11 and 12. Alternatively, either of the interspaces 11 or 12 may be completely or partially filled with oil or oil may flow therethrough. In such a case this interspace is not evacuated but the vacuum connection is used for the oil flowthrough. The vacuum in the annular interspace 11 is expediently so selected that the pressure difference over the radial sealing ring 8 or 9 or further radial sealing rings now shown, remains within the limit admissible for the respectively selected radial sealing ring.

Thrust rings 17 support packing washers of the radial sealing rings 8 and 9. An O-ring 19 provides additional sealing between the pressure piece 5 and the screw shaft spindle 2.

In the space 18 a vacuum of, for example, 0.1 bar is produced by means of a vacuum source (not illustrated) connected to the vacuum line 6 for the purpose of effecting reverse degasification of the material. In contrast, a vacuum of, for example, 0.4 bar is produced in the annular interspace 11 and a vacuum of 0.7 bar is produced in the interspace 12. Improved safety against contamination due to leakage of air, oxygen or other materials is accordingly achieved by constructing the vacuum sealing system according to the invention in such a way that a higher pressure is produced in an annular interspace 11 or 12 than in the space 18, in which the reverse degasification vacuum is effective.

I claim:

1. A screw extruder for processing thermoplastic materials fed thereto, comprising a cylinder; a screw mounted in the cylinder; first vacuum means for applying a vacuum to the cylinder in the region where material is fed to the extruder for the purpose of reverse degasification of the material to be processed in the extruder; back pressure bearing means; a pressure member rotatable with the screw and located between said screw and said back pressure bearing means; an annular non-rotatable end member disposed in front of said rotatable pressure member relativey adjacent said screw, sealing means comprising at least two radial sealing rings surrounding the rotatable pressure member and mounted within said end member, said sealing rings being spaced axially from each other to form an annular interspace therebetween, and second vacuum means for applying a vacuum to said annular interspace, the vacuum applied to said annular interspace being higher than the vacuum applied to the cylinder for the purpose of reverse degasification.

2. A screw extruder as claimed in claim 1 wherein three sealing rings are provided spaced one from the other thereby to form two interspaces between adjacent rings, said second vacuum means communicating with both interspaces for applying a vacuum thereto at a higher pressure than the vacuum applied for reverse degasification.

* * * * *